United States Patent
Schröder et al.

(10) Patent No.: US 6,933,371 B2
(45) Date of Patent: Aug. 23, 2005

(54) BISAZO DYESTUFFS BASED ON HYDROXYNAPHTHALENE CARBOXYLIC ACID

(75) Inventors: Gunter-Rudolf Schröder, Mannheim (DE); Sophia Ebert, Mainz (DE); Karl-Heinz Etzbach, Frankenthal (DE); Rainer Tresch, Maxdorf (DE); Rüdiger Sens, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 330 days.

(21) Appl. No.: 10/363,695

(22) PCT Filed: Sep. 13, 2001

(86) PCT No.: PCT/EP01/10597

§ 371 (c)(1),
(2), (4) Date: Mar. 12, 2003

(87) PCT Pub. No.: WO02/22742

PCT Pub. Date: Mar. 21, 2002

(65) Prior Publication Data

US 2004/0010866 A1 Jan. 22, 2004

(30) Foreign Application Priority Data

Sep. 14, 2000 (DE) .......................... 100 45 430

(51) Int. Cl.$^7$ .................. C09B 35/215; C09B 44/06; D06P 1/41; D06P 1/66
(52) U.S. Cl. ............... 534/614; 534/830; 8/437; 8/654; 8/687; 8/916; 8/918; 8/919; 8/920
(58) Field of Search ................ 534/614, 830; 8/437, 654, 687, 916, 918, 919, 920

(56) References Cited

U.S. PATENT DOCUMENTS

| 3,562,249 A | 2/1971 | Schnabel et al. ........... 534/820 |
| 4,046,502 A | 9/1977 | Moser et al. ................. 8/654 |
| 6,048,969 A | 4/2000 | Schröder et al. ............ 534/614 |

FOREIGN PATENT DOCUMENTS

| CH | 554 399 | | 9/1974 |
| DE | 2061964 | * | 9/1971 |
| DE | 1 768 892 | | 4/1972 |
| DE | 2246495 | * | 3/1973 |
| DE | 198 15 945 | | 10/1999 |
| GB | 1 338 250 | | 11/1973 |
| GB | 1 371 716 | | 10/1974 |

* cited by examiner

*Primary Examiner*—Fiona T. Powers
(74) *Attorney, Agent, or Firm*—Oblon, Spivak, McClelland, Maier & Neustadt, P.C.

(57) ABSTRACT

Disclosed are bisazo compounds of the formula Ia or Ib

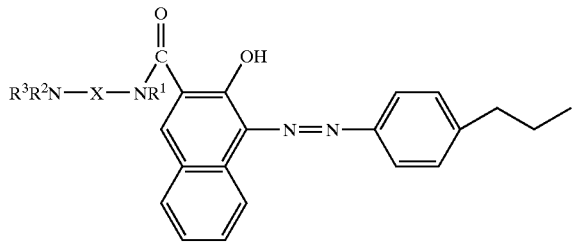
(Ia)

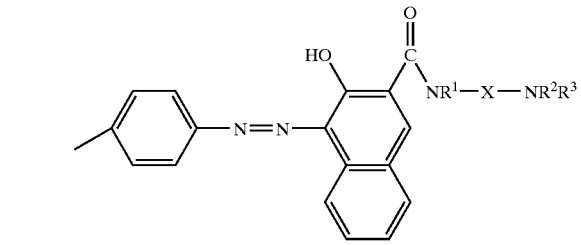

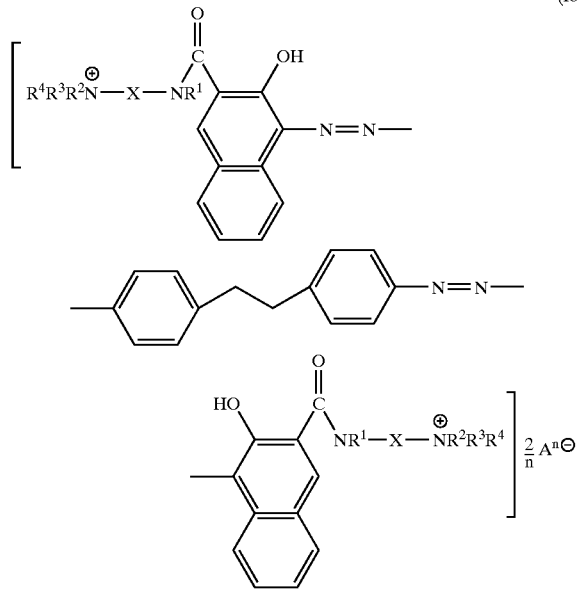

(Ib)

where
$R^1$ is hydrogen or methyl,
the X groups are independently —$CH_2CH_2$— or —$CH_2CH_2CH_2$—,
$R^2$, $R^3$, and $R^4$ are independently hydrogen or methyl,
A is an anion and
n corresponds to the valency of A.

Also disclosed are the use of the bisazo compounds for dyeing, especially paper, and colorants containing said bisazo compounds.

4 Claims, No Drawings

BISAZO DYESTUFFS BASED ON HYDROXYNAPHTHALENE CARBOXYLIC ACID

DESCRIPTION

This invention relates to bisazo dyes based on hydroxynaphthalenecarboxylic acid, colorants containing these bisazo dyes and the use of the bisazo dyes for dyeing natural and synthetic materials.

Bisazo dyes are a major commercial class of dyes, and numerous dyes of this type have been developed.

DE 198 15 945 A 1 discloses cationic sulfonic acid dyes wherein a hydroxyaminonaphthalenesulfonic acid is azo coupled to two phenyl radicals each bearing a substituent having quaternary nitrogen.

DE 1 768 892 A describes bisazo dyes wherein two amide-linked hydroxynapthalenecarboxylic acid radicals are each azo coupled to double substituted phenyl groups.

DE 2 246 495 A discloses bisazo dyes based on hydroxynaphthalenecarboxamides. Two hydroxynaphthalenecarboxamide groups are attached through azo linkages to an aromatic, for example a substituted or unsubstituted compound of the type

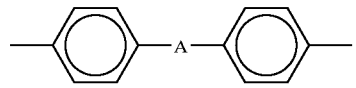

where
A is amido, thiourea, alkylenediamide, phenylenediamide, disulfide, azo, imino, carbonyl or sulfonyl.

U.S. Pat. No. 4,046,502, DE 2 061 964 A and CH 5 554 399 disclose nonionic, monocationic and dicationic bisazo dyes based on hydroxynaphthalenecarboxamides. In these bisazo dyes, hydroxynaphthalenecarboxamide radicals are attached through azo linkages to a compound of the type

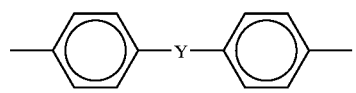

where Y is a direct bond, substituted or unsubstituted alkylene, —S—, —O—, —NH—CO—NH— or —CH=CH—.

The known dyes are unsatisfactory with regard to lightfastness and brilliance.

It is an object of the present invention to provide further, improved dyes possessing both lightfastness and brilliance.

We have found that this object is achieved, surprisingly, by the compounds of the hereinbelow indicated formulae Ia and Ib.

The present invention accordingly provides bisazo compounds of the formula Ia

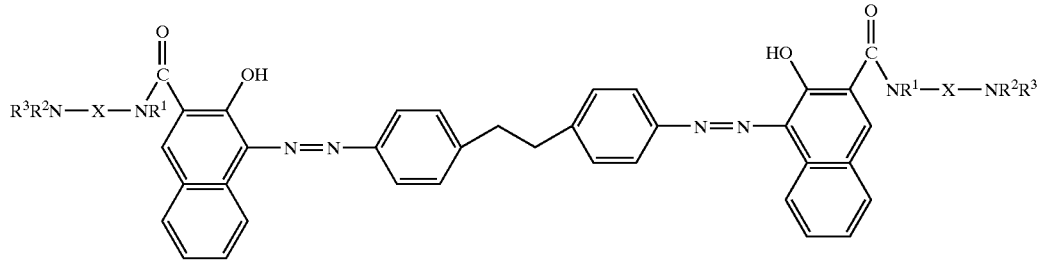

or the formula Ib

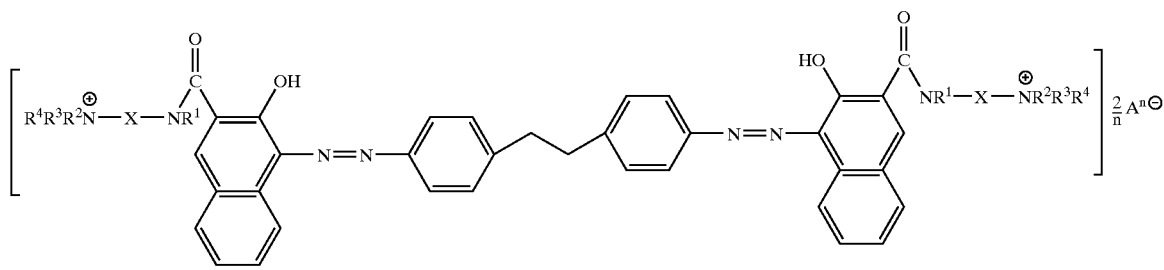

where
$R^1$ is hydrogen or methyl,
the X groups are independently —CH$_2$CH$_2$— or —CH$_2$CH$_2$CH$_2$—,
$R^2$, $R^3$, and $R^4$ are independently hydrogen or methyl,
A is an anion and
n corresponds to the valency of A.

The present invention also provides colorants containing at least one compound of the formula I and optionally other cationic, nonionic or anionic dyes and/or assistants and/or carriers.

The present invention also provides for the use of the compounds of the formula I for dyeing, padding or printing natural or synthetic polymeric material, paper stocks, leather, natural and synthetic fiber materials.

The bisazo compounds of the invention are derivatives of 2-hydroxynaphthalene-3-carboxylic acid (BON acid).

In the bisazo compounds of the invention, the X groups can be identical or different; preferably they are identical.

Similarly, the $NR^2R^3$ and $NR^2R^3R^4$ pairs can be identical or different; preferably they are identical. Particular preference is given to completely symmetrically constructed bisazo compounds.

$NR^2R^3$ is especially

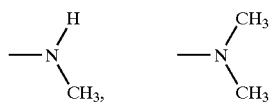

$NR^2R^3R^4$ is especially

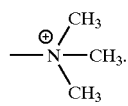

The cationic bisazo compounds of the formula Ib require $A^{\ominus}$ anions for electrical neutrality. Useful anions include inorganic and organic anions, for example fluoride, chloride, bromide, iodide, sulfate, methosulfate, phosphate, anions of carboxylic acids or sulfonic acids, such as formate, acetate, propionate, mono-, di- or trichloroacetate, lactate, methoxyacetate, citrate, succinate, methanesulfonate, benzenesulfonate, 2- or 4-methylbenzenesulfonate or naphthalenesulfonate.

The compounds of the invention may be prepared by the process described in DE 2061964. They may preferably be prepared by diazotization of the compound of the formula II

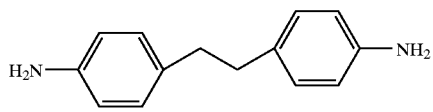

and subsequent azo coupling of a compound of the formula III

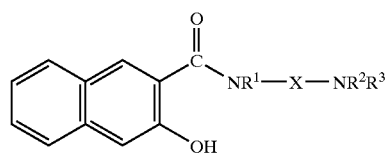

(III)

followed by quaternization, or alternatively by quaternization of the coupling component of the formula IV

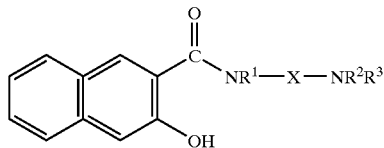

(IV)

and subsequent azo coupling in suitable molar ratios. X, $R^1$, $R^2$ and $R^3$ here each have the aforementioned meanings.

Quaternization is effected for example by reacting a compound of the formula IV with $R^4$-A, where $R^4$ and A are each as defined above. Examples of $R^4$-A are methyl iodide and dimethyl sulfate.

Diazotization, azo coupling, quaternization and also condensation are well known processes and can be carried out by the customary standard methods.

The invention also provides colorants that contain the compounds of the invention. They are generally present in an amount in the range from 0.1 to 20% by weight, based on the total weight of the colorant.

The bisazo compounds of the invention can be used alone, mixed with each other or together with other cationic or anionic compounds in the form of a solution or in the form of powders or granules, i.e., they are very readily combinable. Processing, for example into stable liquid or solid colorants, may be effected in a known manner, for example by grinding or granulating or by dissolving in suitable solvents, in the presence or absence of assistants, for example a stabilizer.

The colorants are preferably present in aqueous solution. They may contain customary assistants, such as wetting agents, thickeners, water-miscible organic solvents, etc. Preferred thickeners are polymers, such as polyacrylic acid, polyacrylic acid derivatives, polyvinylamines, polyvinylamides, polvinyl acetates, polyvinyl alcohols, polyvinylpyrrolidones, polysiloxanes or copolymers thereof. Similarly, oligomers of ethyleneimine, of ethylene oxide or of propylene oxide or derivatives thereof may be used.

The bisazo compounds of the invention are useful for dyeing, padding and printing a wide range of materials, especially paper and paper materials, cellulose, cotton, leather, bast fibers, hemp, flax, sisal, jute, coir or straw. They are especially useful for dyeing, padding and printing acrylonitrile polymer and acrylonitrile interpolymer fibers and yarns and textiles produced therefrom, synthetic, anionic-modified amides and polyesters, a wide range of blend fabrics and synthetic and natural resin materials. They are similarly very useful for, for example, paints and inks, including inkjet inks.

The compounds are preferably useable as dyes in the production of pulp dyed, sized and unsized paper. They can likewise be used for dyeing paper by the dip method.

Dyeing, padding and printing are effected according to well-known processes.

The bisazo compounds of the invention are notable for ready availability and utility as dyes for a wide diversity of various materials and also for superior dye properties.

The novel dyes color the papermaking wastewater only minimally, if at all, which is particularly favorable from the aspect of keeping watercourses clean. They are highly substantive, do not marble on paper and are substantially pH-insensitive. The dyeings on paper especially but also dyeings on other materials are notable for good lightfastness. On prolonged exposure to light the hue changes on tone.

The dyed papers, which possess good bleachability, are wetfast, not only with regard to water, but also with regard to milk, soapy water, sodium chloride solutions, fruit juices and sweetened mineral water. Owing to their good alcohol fastness, they are also stable to alcoholic beverages.

Especially in the case of paper for household purposes and other purposes where it is foreseeable that the dyed paper will come into contact in the wet state with other articles, for example textiles, resistance to bleeding is particularly important. The paper industry sets great store by papers and dyed paper pulp which are easily bleachable, so that they can be reprocessed or used at once for other paper varieties. The bisazo compounds of the invention are very useful for these purposes.

Also worthy of note are their good migration, heat, light and weather fastness, the clean hues and the high color strength.

The non-limiting examples hereinbelow illustrate the invention.

EXAMPLE 1

4.24 g (0.02 mol) of 4,4'-diaminodibenzyl (=1,2-di(4-aminophenyl)ethane) were suspended in 100 ml of water and dissolved by addition of 12 ml of concentrated hydrochloric acid. The solution was cooled down to 0° C. and admixed with 13.2 ml of 30% sodium nitrite solution. Following a diazotization time of 45 minutes at from 0 to 50° C., excess nitrite was decomposed by addition of about 0.2 g of amidosulfonic acid. The thus prepared solution of the diazo component was added dropwise over 30 min to a cooled suspension of 10.9 g (0.04 mol) of 2-hydroxy-3-(3-(N,N-dimethylamino)propyl)naphthamide in 300 ml of water at 0° C. The mixture was subsequently stirred at 5° C. for one hour. During this period, the pH was maintained at from 8 to 9 with 20% aqueous sodium hydroxide solution. Thereafter, the pH was adjusted to 11 by addition of further 20% aqueous sodium hydroxide solution, and the dye was isolated by filtration. Drying leaves 13.94 g (89.5% of theory) of a red dye of the formula:

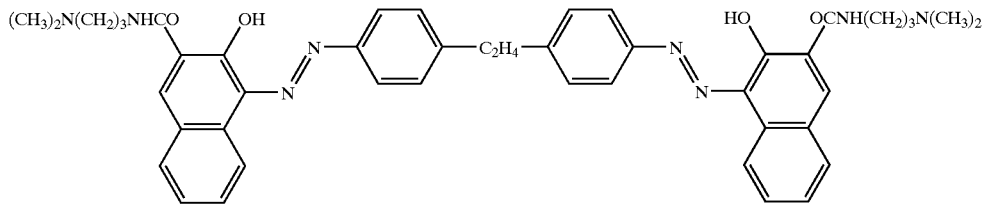

A sample recrystallized from ethyl acetate/ethanol provided the following spectroscopic data:

UV/VIS spectrum (9:1 v/v methanol/acetic acid): $\lambda_{max}$= 536 nm

The following dyes were prepared similarly to Example 1:

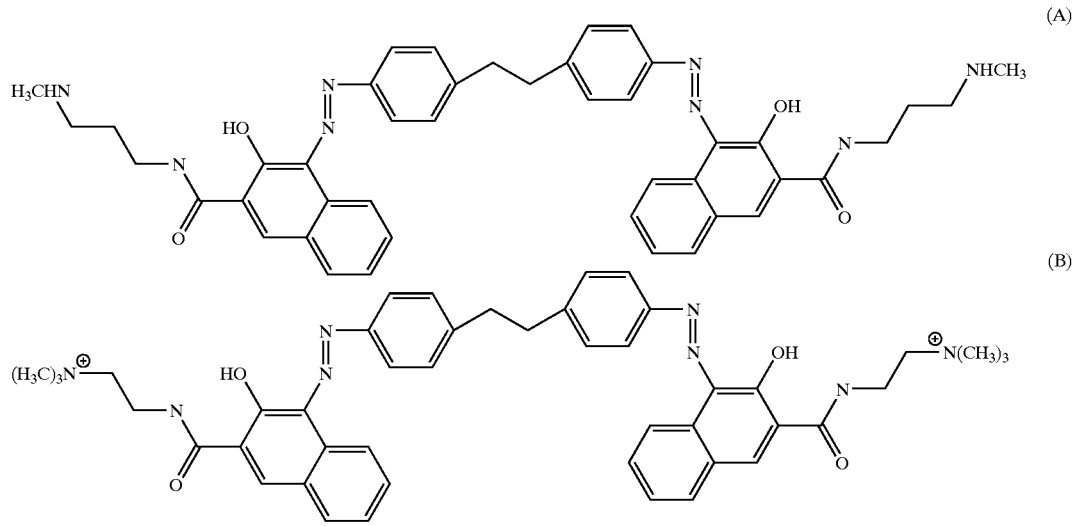

The lightfastness of these compounds was determined according to DIN ISO 105 B 02 in comparison with compounds of the formula

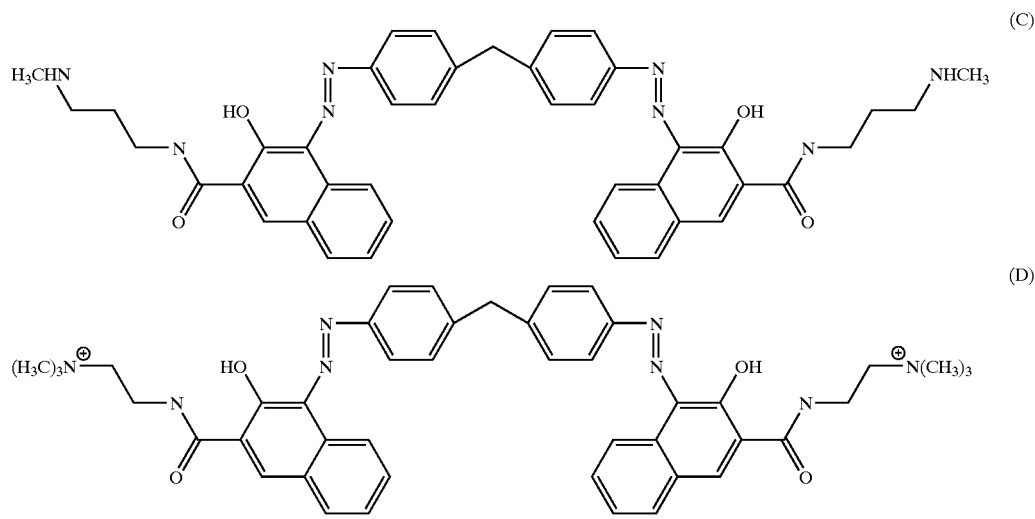

The results are reported below in Table 1.

TABLE 1

| Compound | Lightfastness |
|----------|---------------|
| A | 1–2 |
| B | 1–2 |
| C | <1 |
| D | <1 |

It is clear that compounds A and B of the invention surprisingly have substantially better lightfastness than compounds C and D of DE 2061964. In addition, compounds A and B do not cause cloudiness in tapwater, unlike compounds C and D.

We claim:

1. Bisazo compounds of the formula Ia or Ib

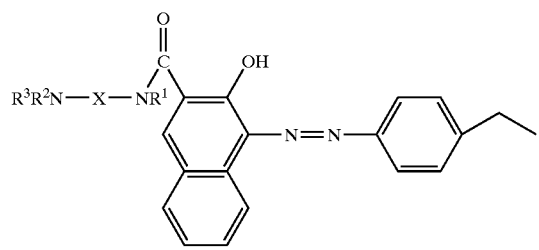

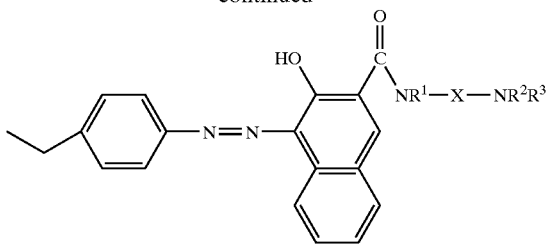

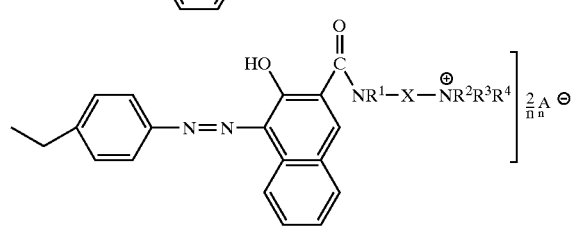

where
$R^1$ is hydrogen or methyl,
the X groups are independently —$CH_2CH_2$— or —$CH_2CH_2CH_2$—,
$R^2$, $R^3$, and $R^4$ are independently hydrogen or methyl,
A is an anion and
n corresponds to the valency of A.

2. Bisazo compounds as claimed in claim 1, of the following formulae

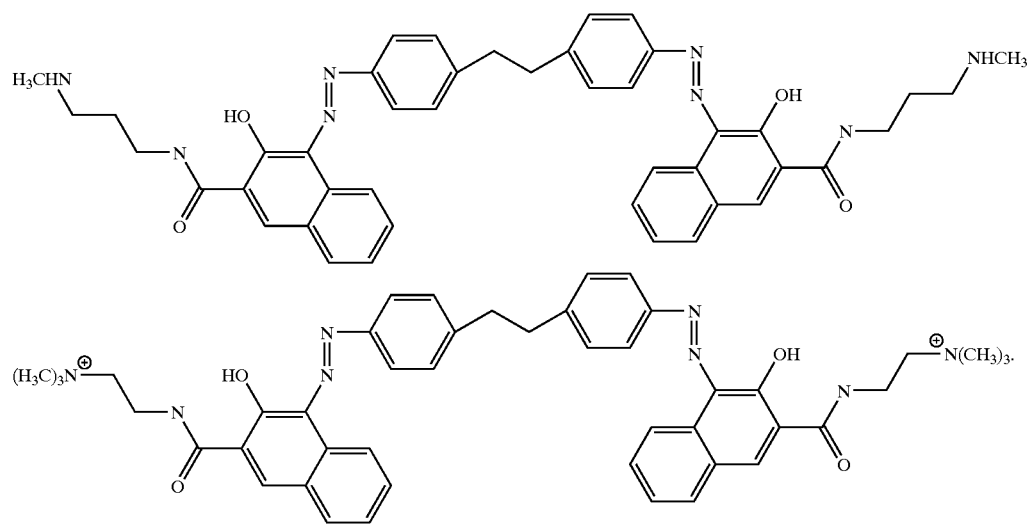

3. A colorant containing at least one compound of the formula Ia or Ib as per claim 1 or 2 and optionally further cationic or anionic or nonionic dyes and/or assistants.

4. A process for dyeing, padding or printing paper, paper materials, cellulose, cotton, leather and natural and synthetic fibers or fiber materials comprising applying thereto a bisazo compound of the formula Ia or Ib as per claim 1.

* * * * *